US007787621B2

(12) United States Patent
Noble et al.

(10) Patent No.: US 7,787,621 B2
(45) Date of Patent: *Aug. 31, 2010

(54) SECURE TRANSMISSION USING ADAPTIVE TRANSFORMATION AND PLURAL CHANNELS

(75) Inventors: Gary Paul Noble, Worcestershire (GB); Peter John Stretton, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 155 days.

This patent is subject to a terminal disclaimer.

(21) Appl. No.: 11/929,365

(22) Filed: Oct. 30, 2007

(65) Prior Publication Data

US 2008/0060016 A1 Mar. 6, 2008

Related U.S. Application Data

(63) Continuation of application No. 10/375,227, filed on Feb. 27, 2003, now Pat. No. 7,313,693.

(30) Foreign Application Priority Data

Oct. 23, 2002 (GB) ................. 0224632.0

(51) Int. Cl.
  *H04K 1/10* (2006.01)
  *H04K 1/04* (2006.01)
  *H04L 9/00* (2006.01)
(52) U.S. Cl. ............... 380/33; 380/34; 380/36; 380/47
(58) Field of Classification Search ........... 380/33, 380/34, 36, 47
See application file for complete search history.

(56) References Cited

U.S. PATENT DOCUMENTS

| 5,091,782 | A | * | 2/1992 | Krause et al. ............ 348/400.1 |
| 5,404,374 | A | | 4/1995 | Mullins et al. |
| 5,539,586 | A | * | 7/1996 | Inoue et al. ................. 386/101 |
| 6,141,784 | A | * | 10/2000 | Davis et al. ................. 714/748 |
| 6,377,690 | B1 | | 4/2002 | Witschorik et al. |
| 6,920,150 | B1 | | 7/2005 | Pauls et al. |
| 6,931,026 | B1 | | 8/2005 | Lee et al. |
| 6,983,057 | B1 | | 1/2006 | Ho et al. |
| 6,987,770 | B1 | | 1/2006 | Yonge, III |
| 7,061,929 | B1 | * | 6/2006 | Eberle et al. ................ 370/423 |

FOREIGN PATENT DOCUMENTS

| NL | 1005523 | 9/1998 |
| WO | WO 00/18078 | 3/2000 |

* cited by examiner

*Primary Examiner*—Nasser Moazzami
*Assistant Examiner*—Mohammad W Reza
(74) *Attorney, Agent, or Firm*—Scully, Scott, Murphy & Presser, P.C.; William H. Steinberg, Esq.

(57) ABSTRACT

A method, apparatus and computer program product for transmitting data secures the data by adaptively transforming it and spreading the transformed data piecewise over plural transmission channels. The method, apparatus and computer program product may select low-cost channels preferentially to transmit greater amounts of the data; may disorder the data and transmit ordering information separately over a preferred channel of higher security; may conceal data in a lower-security channel by steganographic methods; and may conceal the sequence of the data by placing segments of it statically, for example, in a WWW website, while providing sequencing data on the preferred channel of higher security. A receiving method, apparatus and computer program product may also be provided for recovering information content from signals on the plural channels.

12 Claims, 4 Drawing Sheets

SECURE TRANSMISSION USING ADAPTIVE TRANSFORMATION AND PLURAL CHANNELS

"This application is a continuation of U.S. application Ser. No. 10/375,227 filed on Feb. 27, 2003."

FIELD OF THE INVENTION

This invention relates to securely transmitting data, and more particularly to achieving improved protection against the breaching of security even when data is sent over a channel subject to interception.

BACKGROUND OF THE INVENTION

The securing of data during transmission has been of interest throughout human history. Secure communication has been an essential part of commerce since time immemorial.

More recently, and especially since the widespread availability of computing power and technical means of data transmission, with sophisticated means of securing data transmitted over telecommunications channels and equally sophisticated technical means of decrypting messages, there has developed a rapidly-accelerating race between those who wish to secure messages and those who wish to "crack" them.

There is a constant search for new technical means of securing data during transmission by increasing the threshold of feasibility of decryption, and an equally constant search for means of rendering feasible decryptions that were thought to be infeasible. Similarly, the processing and transmission costs of sending information securely are of concern. The volume of data to be transmitted in the course of business transactions is increasing, and the cost of using public networks is constantly decreasing, while the cost of using private networks is ever more costly. It would be advantageous to be able to send more data, especially in bulk data applications, over less costly open channels, such as the Internet, but it is difficult to secure transmissions over such a medium to the standard normally required for commercial confidentiality purposes.

There have been attempts to alleviate the problem of combining security with low cost.

Published European patent application number EP 0 993 142 A1, for example, proposes a method for providing security for data wherein the bulk of transmitted data is encrypted and transmitted over an inherently less secure channel while selected segments of data are transmitted over a normally private channel, such as the telephone network. An eavesdropper on the less secure channel is thus prevented from reading all the data. Disclosed also is the notion of using one or more scrambling algorithms to scramble data according to a formula derived from the data itself.

Published PCT patent application number WO 00/18078 proposes a method whereby a message is split and transmitted over two channels in such a manner that the portion of the message to be sent over the less secure channel is encrypted, while the portion transmitted over the secure channel remains unencrypted.

It is desirable to find a way of further increasing the security of a message by reducing the computational feasibility of an unauthorized person's recovering the information content of the message and reducing the cost of processing and transmission.

SUMMARY OF THE INVENTION

The present invention accordingly provides, in a first aspect, a method for securely transmitting data comprising the steps of adaptively transforming said data using a data position-dependent adaptive transformation technique; breaking said data into segments; transmitting one or more segments of said data over a first transmission channel; and transmitting one or more segments of said data over a second transmission channel.

The method of the first aspect preferably further comprises the step of rearranging the sequence in which said one or more segments are transmitted over said second transmission channel.

Preferably, said first channel is a secure channel and said second channel is an insecure channel, and a greater number of said segments is transmitted over said insecure channel than is transmitted over said insecure channel.

Preferably, said data position-dependent adaptive transformation technique is an adaptive compression technique.

The method of the first aspect further comprises the steps of receiving said one or more segments from said first and said second transmission channels; resequencing said one or more segments; performing an adaptive inverse transformation on said segments to recover an original information content; and outputting said original information content.

In a second aspect, the present invention provides an apparatus for securely transmitting data comprising a data position-dependent adaptive transformer for adaptively transforming said data; a splitter for breaking said data into segments; a transmitter for transmitting one or more segments of said data over a first transmission channel; and a transmitter for transmitting one or more segments of said data over a second transmission channel.

The apparatus of the second aspect preferably further comprises a desequencer for rearranging the sequence in which said one or more segments are transmitted over said second transmission channel.

Preferably, said first channel is a secure channel and said second channel is an insecure channel, and wherein a greater number of said segments is transmitted over said insecure channel than is transmitted over said insecure channel.

Preferably, said data position-dependent adaptive transformation technique is an adaptive compression technique.

Preferably, the apparatus further comprises a receiver for receiving signals from said first and said second channels; a resequencer for resequencing said signals; a position-dependent adaptive inverse transformer for transforming said signals; and an output for outputting information content.

In a third aspect, the present invention provides a computer program product tangibly embodied in a storage medium to, when loaded into a computer system and executed, securely transmit data, said computer program product comprising computer program code means to adaptively transform said data using a data position-dependent adaptive transformation technique; computer program code means to break said data into segments; computer program code means to transmit one or more segments of said data over a first transmission channel; and computer program code means to transmit one or more segments of said data over a second transmission channel.

The computer program product of the third aspect preferably further comprises computer program code means to rearrange the sequence in which said one or more segments are transmitted over said second transmission channel.

In a fourth aspect, the present invention provides a method for receiving securely transmitted data previously encoded and transmitted by a method comprising the steps of adaptively transforming said data using a data position-dependent adaptive transformation technique; breaking said data into segments; transmitting one or more segments of said data over a first transmission channel; and transmitting one or more segments of said data over a second transmission channel.

In a fifth aspects the present invention provides a method for receiving securely transmitted data previously encoded and transmitted by at least one of an apparatus and a computer program product comprising a data position-dependent adaptive transformer for adaptively transforming said data; a splitter for breaking said data into segments; a transmitter for transmitting one or more segments of said data over a first transmission channel; and a transmitter for transmitting one or more segments of said data over a second transmission channel.

BRIEF DESCRIPTION OF THE DRAWINGS

A preferred embodiment of the present invention will now be described by way of example only, with reference to the accompanying drawings, in which:

FIG. 1 also illustrates the computer program code steps required to implement a presently preferred embodiment of the present invention in a computer program product.

DETAILED DESCRIPTION OF THE PREFERRED EMBODIMENT

Figure 1:
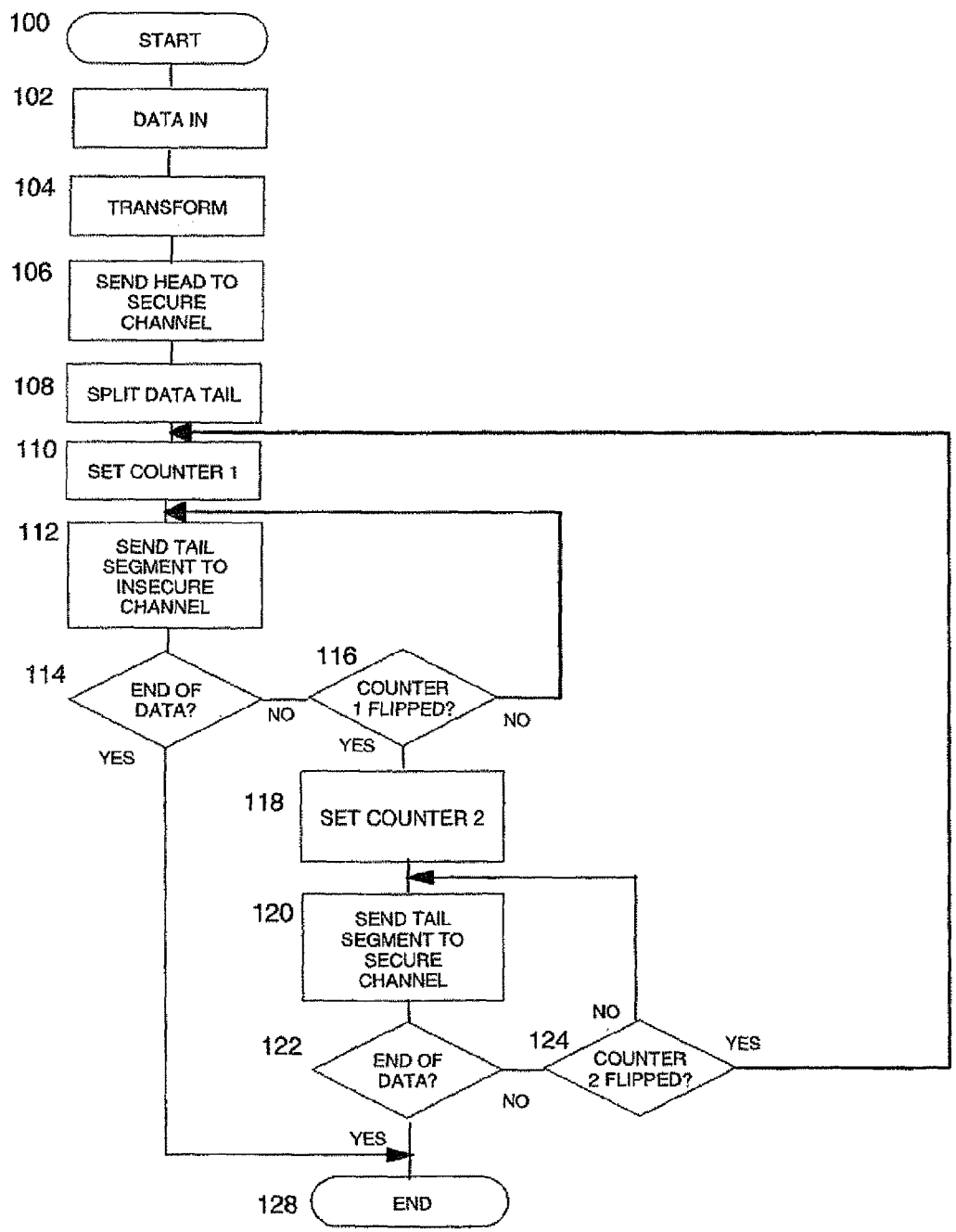
FIG. 1 is a process flow diagram representing a method of a presently preferred embodiment of the present invention.

Turning now to FIG. 1, there are shown the steps of a method according to a presently preferred embodiment. FIG. 1 also illustrates the computer program code steps required to implement a presently preferred embodiment of the present invention in a computer program product, but for brevity, the method steps will be described here. It will be clear to those skilled in the programming art that the method lends itself to embodiment in program code means implementing each of the logical method steps.

The method begins at START step 100, and the data to be transmitted is received at an input 102. The data is then subjected to an adaptive transform technique at step 104. It is presently most preferred that the technique be a form of adaptive compression, for example, Lempel-Ziv compression, adaptive Huffman compression, adaptive arithmetic encoding or the like. These compression methods are well-known in the art, and will not be further described, except to point out that they have a characteristic in common, in that all the data in the compressed datastream is position-dependent. That is, a particular pattern of bits at one point in the datastream may mean one thing, and at a "later" point in the data stream may mean something different. There is a backward dependency that becomes greater as the length of the datastream grows. A further characteristic is that these methods may use variable-length tokens to represent variable lengths of cleartext. Particularly advantageously, adaptive dictionary Lempel-ziv compression depends on the existence of an agreed notional base dictionary of primitives on which the full adaptive dictionary is adaptively built as a data stream is compressed. Unless the interceptor of a data signal knows what that base dictionary is, there is an initial difficulty in understanding how to interpret the data to recover information content.

For example, in variable length adaptive dictionary Lempel-Ziv encoding, a 9-bit sequence may be used for the first 4096 tokens representing references into a notional dictionary, and then a signal may be attached to the datastream to indicate a "change-up" to 10-bit tokens for the next 4096 tokens. These two characteristics are observed to be a drawback in circumstances in which the channel of transmission may be broken, for example in mobile telephony, where a receiver may pass under a train tunnel, or into other "dead ground" where the signal breaks down. If a transmission is underway, because the presently transmitted data has a backward dependency on the earlier data, the receiver becomes unable to continue decompressing the datastream. Continuity having been broken, the receiver does not know what the tokens now being received represent, nor even, possibly, how long they now are.

This drawback, however, may be exploited in circumstances in which the transmitter wishes to prevent a receiver from being able to reconstruct the datastream, as is the case in providing security of transmission, when the data needs to be secured against an eavesdropping receiver. The presently most preferred embodiment of the invention takes advantage of this characteristic of adaptive compression. In an alternative, other forms of adaptive transformation, such as adaptive (or "rolling") encryption may be used instead of adaptive compression. The use of adaptive compression as part of the means of securing the data has the advantage over encryption that the data is simultaneously compressed and secured, thereby saving processing time and cost and transmission time and cost.

Returning to FIG. 1, the head segment of the adaptively transformed data is now sent over the secure channel at step 106. The use of head functions in programming languages to operate on data taken from the beginning of a sequence of data is well-known to those skilled in the art and need not be explained further here. The length of head data that is sent can be optimized depending on data type, amount of repetition and inherent predictability. It is preferred, for example, to transmit, in the case of the Lempel-Ziv exemplary embodiment, the header information and some portion of the first 4096 tokens, such that the eavesdropper is unaware of the start position of the datastream relative to the beginning of the notional dictionary.

At step 10S, the adaptively-transformed data is now split into segments determined by clock or counter functions primed by a pseudorandom number generator function. The pseudorandom number generator function should be constrained to provide an output lying between a determined clock or counter minimum and a corresponding maximum to give bursts of data of varying lengths. The function may also advantageously be biased to preferentially select shorter generated lengths for the data that is subsequently to be transmitted over the conventionally more expensive secure channel.

A first counter or clock (hereafter referred to as Counter 1) is set at step 110, based on the output from the pseudorandom number generator function, and at step 112 a segment of tail data is transmitted over the insecure channel until either an end-of-data condition is signalled 114, or Counter 1 reaches its threshold and "flips" at step 116. The tail function is a well-known programming language function, like head, but which operates on data from the remainder of a sequence after a head operation. If the end-of-data has not yet been reached, and Counter 1 has flipped, a counter or clock (hereafter referred to as Counter 2) is set at step 118. The next segment of tail data is transmitted over the secure channel at step 120 until either an end-of-data condition is signalled at step 122, or Counter 2 flips at step 124. If Counter 2 has flipped at step 124, control returns to step 110 where Counter 1 is set and the process from steps 110 iterates until end of data is signalled at either step 114 or step 122, when the process reaches END step 128.

Figure 2:
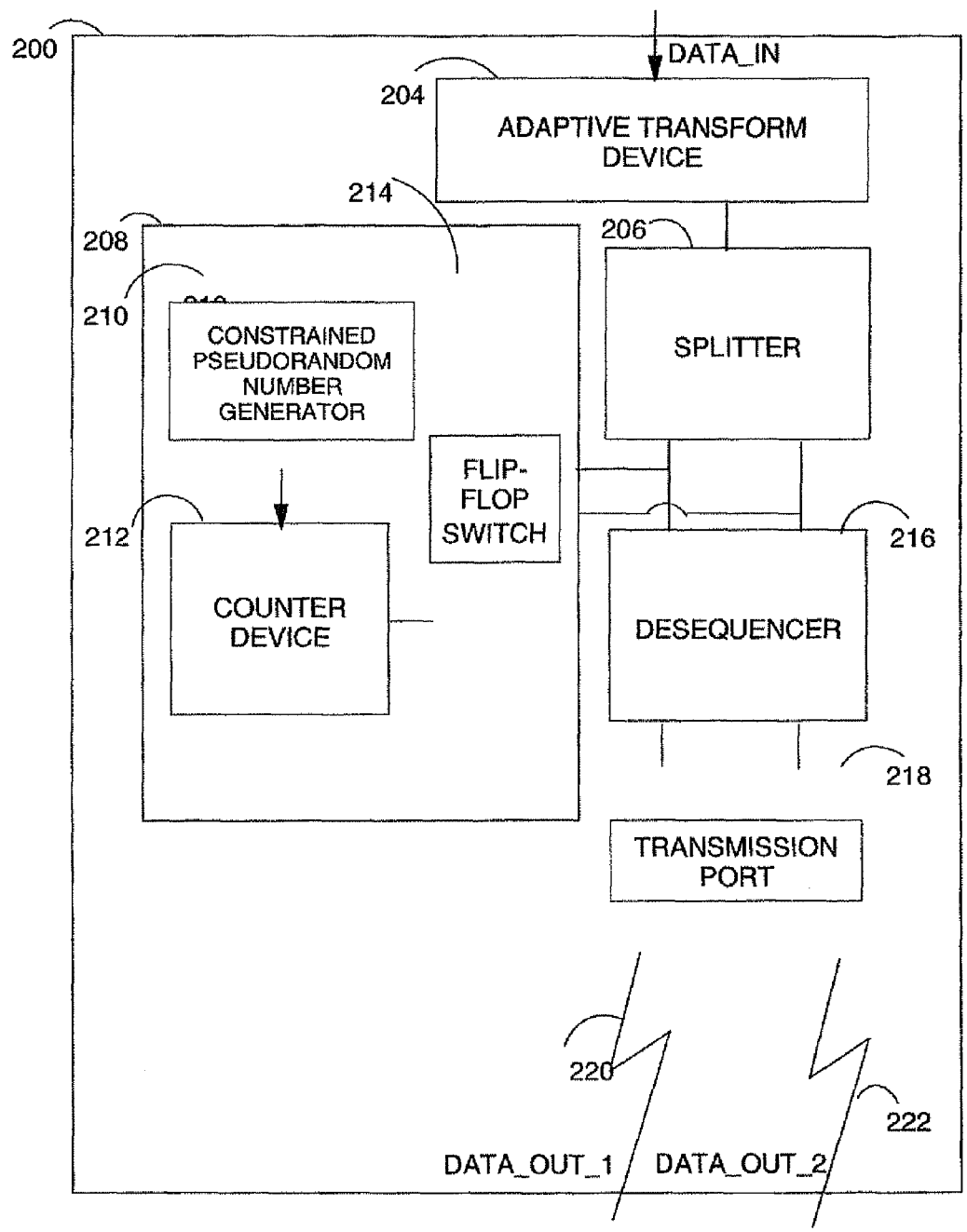
FIG. 2 is a block-level device diagram illustrating an apparatus in accordance with a presently preferred embodiment of the present invention in hardware.

Turning now to FIG. 2, there is shown a block-level device diagram illustrating an apparatus in accordance with a presently preferred embodiment of the present invention in hardware.

FIG. 2 shows an apparatus 200 with input DATA_IN to an adaptive transform device 204. Adaptive transform device 204 may be a hardware Lempel-Ziv encoder device in a presently most preferred embodiment. In an alternative it may be, for example a device for performing any other adaptive transform, such as adaptive compression by other means or adaptive encryption, as described above. Adaptive transform device 204 is operatively connected to splitter 206, which may be any of the well-known signal splitting devices available commercially.

Splitter 206 receives sequential data signals from the output of adaptive transform device 204 and splits them between its two or more outputs. The output path from splitter 206 is under the control of a switching device 208, comprising a constrained pseudorandom number generator 210.

The concept of constraints on pseudorandom numbers for various purposes is well-known in the art. One implementation of such a generator is to have a normal pseudorandom number generator having an output in its normal arithmetic converted to a number in a modular arithmetic system.

Generator 210 is in turn operatively connected to counter device 212 which may be a clock device in an alternative embodiment. The function of counter device 212 is to count or time the transmissions over each of the secure and insecure channels and to operate flip-flop switch 214.

Flip-flop switch 204 in turn operates to gate the signals on the outputs of splitter 206 according to the counts or times controlled by counter device 212.

The outputs from splitter 206 are thus channelled to desequencer 216 via one or the other of the outputs of splitter 206. Desequencer 216 operates to rearrange the order in which the data segments are to be transmitted and to ensure that the sequencing "header" information required to reassemble the entire data transmission at the receiver end is selected to be transmitted over the secure channel.

The signal from desequencer 216 is now passed down one of the two outputs of desequencer 216 to transmission port 218 where each data segment is prepared for transmission and transmitted over either secure channel 220 at output DATA_OUT_1 or insecure channel 222 at output DATA_OUT_2.

In this manner, the preferred embodiment of the present invention reduces the computational feasibility of an unauthorized person's deriving information content from an intercepted signal. The unauthorized person is hindered by not knowing the true sequence and the start point of the data being signalled, nor the meaning and lengths of the tokens in the signal.

It will be appreciated that the method described above will typically be carried out in software running on a processor (not shown), and that the software may be provided as a computer program product carried on any suitable data carrier (also not shown) such as a magnetic or optical computer disc.

Figure 3:
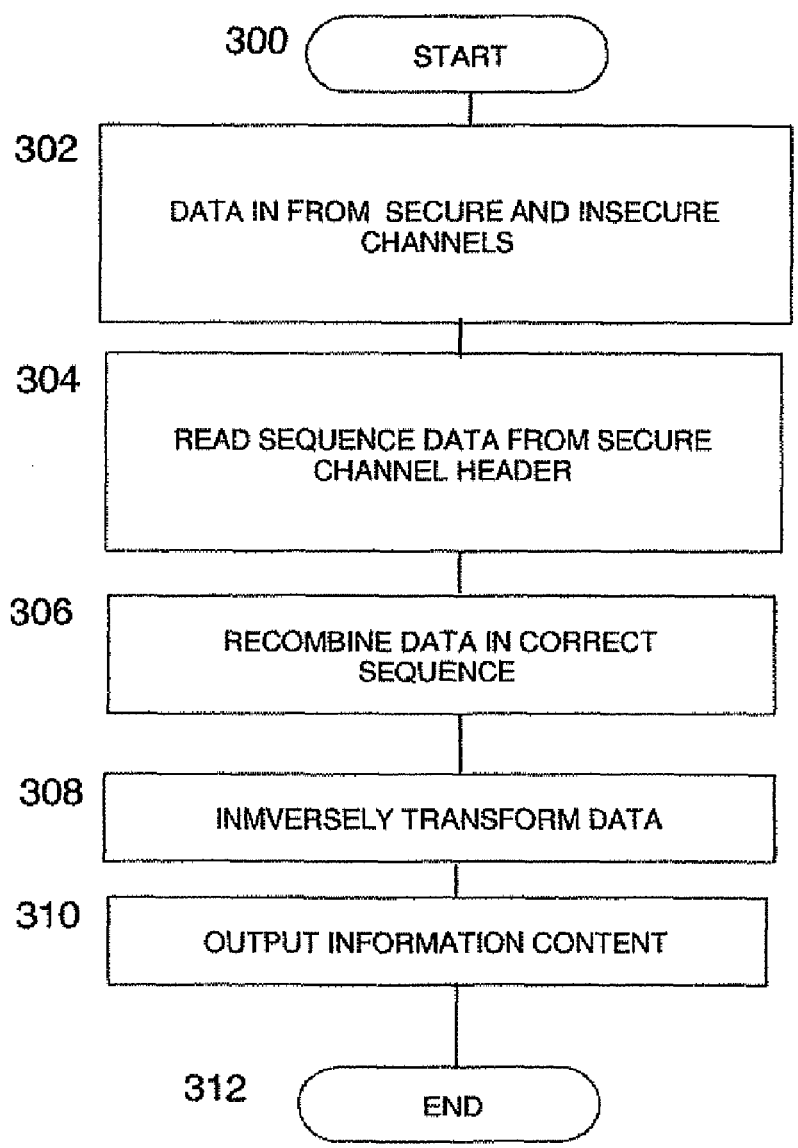
FIG. 3 is a process flow diagram representing a preferred further feature of the present invention to incorporate an information recovery method FIG. 1 also illustrates the computer program code steps required to implement the preferred feature in a computer program product.

Turning now to FIG. 3, there is shown a process flow diagram representing a preferred further feature of the present invention to incorporate an information recovery method. FIG. 3 also illustrates the computer program code steps required to implement the preferred feature in a computer program product.

The flow begins at START 300, and a step 302, data is received from the secure and insecure channels. It is necessary to understand the original sequence of segments as transmitted, and to this end, at step 304 the method includes a step of reading sequence data from the header that was preferentially transmitted with some early data over the secure channel. At step 306, the data is recombined in sequence based on the sequence data from the header. The data is then in condition to be inversely transformed using a position-dependent adaptive transformation technique. Essentially this is the mirror of the original transformation as, for example is the case with the Lempel-Ziv compression algorithm, as used in a presently preferred embodiment of the present invention. At step 310, the information content is output, and the method ends at END 312.

Figure 4:
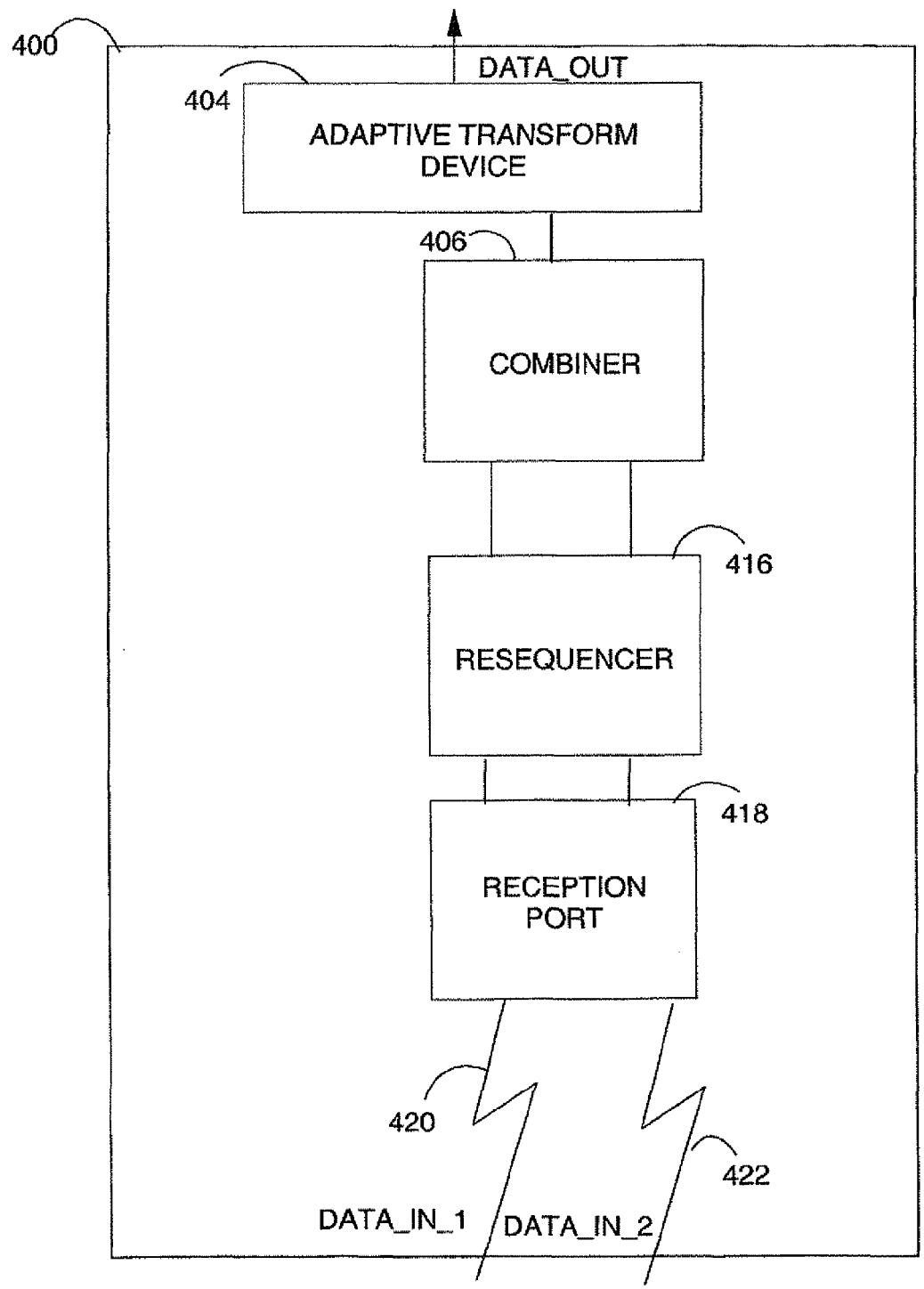
FIG. 4 is a block-level device diagram illustrating an apparatus embodying a preferred feature of the present invention in hardware.

FIG. 4 shows a block-level device diagram illustrating an apparatus embodying the preferred receiver feature of the present invention in hardware.

In FIG. 4 is shown receiver apparatus 400. Inputs DATA_IN_1 and DATA_IN_2 are received at reception port 418 from channels 420 and 422, Reception port 418 passes the data signals to resequencer 416 which recovers the sequence data from the header information received from the secure channel and resequences the data segments ready for the signals from the two channels to be combined by combiner 406. Combiner 406 passes the recombined data signal to adaptive transform device 404, which performs an inverse adaptive transform to recover the original information content and output it at DATA_OUT.

It will be appreciated that the method described above will typically be carried out in software running on a processor (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

While the exemplary embodiment has been described in terms of a data signal being transmitted over a medium, it will be appreciated by one of ordinary skill in the art that the data may also be held as a static entity, in for example, one or more World Wide Web pages on the Internet, from which it may be retrieved by conventional browser means before being processed according to the method or by the apparatus or computer program product of the preferred embodiment of the invention.

The present invention may suitably be embodied as a computer program product for use with a computer system. Such an implementation may comprise a series of computer readable instructions either fixed on a tangible medium, such as a computer readable medium, e.g., diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, e.g., shrink wrapped software, pre-loaded with a computer system, e.g., on a system ROM or fixed disk, or distributed from a server or electronic bulletin board over a network, e.g., the Internet or world Wide Web.

It will be appreciated that various modifications to the embodiment described above will be apparent to a person of ordinary skill in the art. For example, any data that is either transmitted or statically held for retrieval may be treated by further methods of obfuscation, such as encryption methods or steganographic, or data-hiding, methods, to render the problem faced by an interceptor further lacking in tractability.

In this manner, the preferred embodiment of the present invention reduces the computational feasibility of an unauthorized person's deriving information content from an intercepted signal. The unauthorized person is hindered by not knowing the true sequence and the start point of the data being signalled, nor the meaning and lengths of the tokens in the signal.

The invention claimed is:

1. A method for securely transmitting data comprising the steps of:
    adaptively transforming said data using a data position-dependent adaptive transformation technique;
    breaking said data into segments;
    transmitting one or more segments of said data over a first transmission channel; and
    transmitting one or more segments of said data over a second transmission channel,
    wherein the transmitting one or more segments of said data over a first transmission channel includes setting a first counter based on an output from a pseudorandom number generator function and transmitting over the first transmission channel until the first counter reaches its threshold, and switching to transmitting one or more segments of said data over the second transmission channel,
    wherein transmitting one or more segments of said data over a second transmission channel further includes setting a second counter based on an output from a pseudorandom number generator function and transmitting over the second transmission channel until the second counter reaches its threshold, and switching to transmitting one or more segments of said data over the first transmission channel,
    wherein said first channel is a secure channel and said second channel is an insecure channel, and wherein segments with shorter generated lengths of said data are selected to be transmitted over said secure channel.

2. A method as claimed in claim 1, further comprising the step of:
    rearranging the sequence in which said one or more segments are transmitted over said second transmission channel.

3. A method as claimed in claim 1, wherein said data position-dependent adaptive transformation technique is an adaptive compression technique.

4. A method as claimed in claim 1, further comprising the steps of:
    receiving said one or more segments from said first and said second transmission channels;
    resequencing said one or more segments;
    performing an adaptive inverse transformation on said segments to recover an original information content; and
    outputting said original information content.

5. An apparatus for securely transmitting data comprising:
    a processor;
    a data position-dependent adaptive transformer for adaptively transforming said data;
    a splitter for breaking said data into segments;
    a transmitter for transmitting one or more segments of said data over a first transmission channel; and
    a transmitter for transmitting one or more segments of said data over a second transmission channel,
    a first counter set based on an output from a pseudorandom number generator function, wherein the transmitter transmits one or more segments of said data over the first transmission channel until the first counter reaches its threshold, and transmission is switched to the second transmission channel,
    wherein the transmitter for transmitting one or more segments of said data over a second transmission channel sets a second counter based on an output from a pseudorandom number generator function and transmits over the second transmission channel until the second counter reaches its threshold, and switches to transmitting one or more segments of said data over the first transmission channel,
    wherein said first channel is a secure channel and said second channel is an insecure channel, and wherein segments with shorter generated lengths of said data are selected to be transmitted over said secure channel.

6. An apparatus as claimed in claim 5, further comprising:
    a desequencer for rearranging the sequence in which said one or more segments are transmitted over said second transmission channel.

7. An apparatus as claimed in claim 5, wherein said data position-dependent adaptive transformation technique is an adaptive compression technique.

8. An apparatus as claimed in claim 5, further comprising:
    a receiver for receiving signals from said first and said second channels;
    a resequencer for resequencing said signals;
    a position-dependent adaptive inverse transformer for transforming said signals; and
    an output for outputting information content.

9. A physical storage medium storing computer program code executable by a machine, said medium comprising at least:
    computer program code to adaptively transform said data using a data position-dependent adaptive transformation technique;
    computer program code to break said data into segments;
    computer program code to transmit one or more segments of said data over a first transmission channel; and computer program code to transmit one or more segments of said data over a second transmission channel, computer program code to set a first counter based on an output from a pseudorandom number generator function, wherein transmission is performed over the first transmission channel until the first counter reaches its threshold, and switched to the second transmission channel, wherein transmitting one or more segments of said data over a second transmission channel further includes setting a second counter based on an output from a pseudorandom number generator function and transmitting over the second transmission channel until the second counter reaches its threshold, and switching to transmitting one or more segments of said data over the first transmission channel, wherein said first channel is a secure channel and said second channel is an insecure channel, and wherein segments with shorter generated lengths of said data are selected to be transmitted over said secure channel.

10. A physical storage medium as claimed in claim 9, further comprising:

computer program code to rearrange the sequence in which said one or more segments are transmitted over said second transmission channel.

11. A method for receiving securely transmitted data previously encoded and transmitted by a method comprising the steps of:

adaptively transforming said data using a data position-dependent adaptive transformation technique;

breaking said data into segments;

transmitting one or more segments of said data over a first transmission channel; and transmitting one or more segments of said data over a second transmission channel, wherein the transmitting one or more segments of said data over a first transmission channel includes setting a first counter based on an output from a pseudorandom number generator function and transmitting over the first transmission channel until the first counter reaches its threshold, and switching to transmitting one or more segments of said data over the second transmission channel, wherein transmitting one or more segments of said data over a second transmission channel further includes setting a second counter based on an output from a pseudorandom number generator function and transmitting over the second transmission channel until the second counter reaches its threshold, and switching to transmitting one or more segments of said data over the first transmission channel, wherein said first channel is a secure channel and said second channel is an insecure channel, and wherein segments with shorter generated lengths of said data are selected to be transmitted over said secure channel.

12. An apparatus for receiving securely transmitted data previously encoded and transmitted by at least one of an apparatus and a computer program product comprising:

a processor;

a data position-dependent adaptive transformer for adaptively transforming said data;

a splitter for breaking said data into segments;

a transmitter for transmitting one or more segments of said data over a first transmission channel; and a transmitter for transmitting one or more segments of said data over a second transmission channel, a first counter set based on an output from a pseudorandom number generator function, wherein the transmitter transmits one or more segments of said data over the first transmission channel until the first counter reaches its threshold, and transmission is switched to the second transmission channel, wherein the transmitter for transmitting one or more segments of said data over a second transmission channel sets a second counter based on an output from a pseudorandom number generator function and transmits over the second transmission channel until the second counter reaches its threshold, and switches to transmitting one or more segments of said data over the first transmission channel, wherein said first channel is a secure channel and said second channel is an insecure channel, and wherein segments with shorter generated lengths of said data are selected to be transmitted over said secure channel.

* * * * *